United States Patent [19]

Abbeloos

[11] 4,135,796
[45] Jan. 23, 1979

[54] FLASH SYNCHRONIZATION INTERLOCK

[76] Inventor: Charles Abbeloos, 5585 Verdi St., Brossard, Quebec, Canada, J4W 1B4

[21] Appl. No.: 797,079

[22] Filed: May 16, 1977

[51] Int. Cl.² ............................................. G03B 15/02
[52] U.S. Cl. .................................................... 354/126
[58] Field of Search ............... 354/126, 129, 139, 140, 354/145, 146, 149

[56] References Cited

U.S. PATENT DOCUMENTS

| | | | |
|---|---|---|---|
| 3,005,392 | 10/1961 | Kaden | 354/126 |
| 3,204,541 | 9/1965 | Frost et al. | 354/149 |
| 3,318,215 | 5/1967 | Schiks | 354/139 |

FOREIGN PATENT DOCUMENTS 1136480  12/1968  United Kingdom ..................... 354/129

Primary Examiner—Donald A. Griffin
Attorney, Agent, or Firm—Howard I. Podell

[57] ABSTRACT

A mechanical linkage in a focal plane shutter type of camera which prevents insertion of a flash attachment to the mating shoe of the camera and insertion of a flash cord in the X synchronization socket of the camera unless the camera shutter speed control knob is set for a shutter speed within the proper range for use with the flash attachment. Conversely, the linkage prevents rotation of the shutter speed control knob beyond the proper range for use with flash apparatus when a flash attachment is mounted to the shoe of the camera or a flash cord has been inserted in the X synchronization socket of the camera.

1 Claim, 3 Drawing Figures

FLASH SYNCHRONIZATION INTERLOCK

SUMMARY OF THE INVENTION

This invention is a mechanical linkage in a focal plane shutter type of camera which prevents insertion of a flash attachment to the mating shoe of the camera and insertion of a flash cord in the X synchronization socket of the camera unless the camera shutter speed control knob is set for a shutter speed within the proper range for use with the flash attachment. Conversely, the linkage prevents rotation of the shutter speed control knob beyond the proper range for use with flash apparatus when a flash attachment is mounted to the shoe of the camera or a flash cord has been inserted in the X synchronization socket of the camera.

Focal plane shutter camera may only be properly used with X type synchronization flash units at or below a specific shutter speed for the particular camera such as 1/125, 1/90 or 1/60 of a second, depending on the camera. This invention prevents the inadvertent use of such a camera with an X-type flash unit when the camera is inadvertently set to a faster shutter speed than is proper for flash, since such a faster shutter speed would result in only partially exposing the film frame during the relatively instantaneous period of the flash light.

While this invention does not distinguish between the attachment of an X-type or an M-type flash unit to the camera shoe, it does permit the use of M-type flash units by insertion of the flash cord in the M synchronization socket of the camera when separately mounted from the camera at any shutter speed but does prevent the use of X-type flash units either when mounted to the camera shoe, or when separately held and electrically connected to the X electrical socket of the camera, at the improper shutter speeds for the X-type unit.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
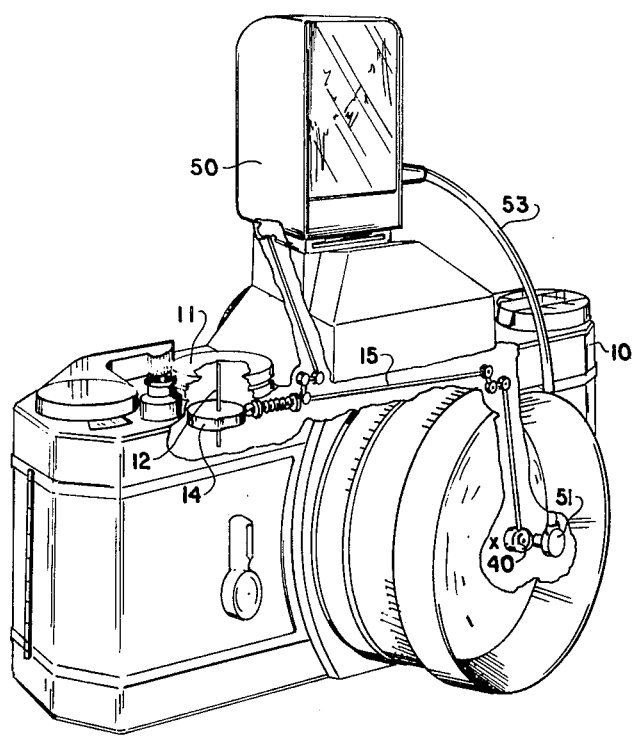
FIG. 1 is a perspective view of the invention in use.
Figure 2:
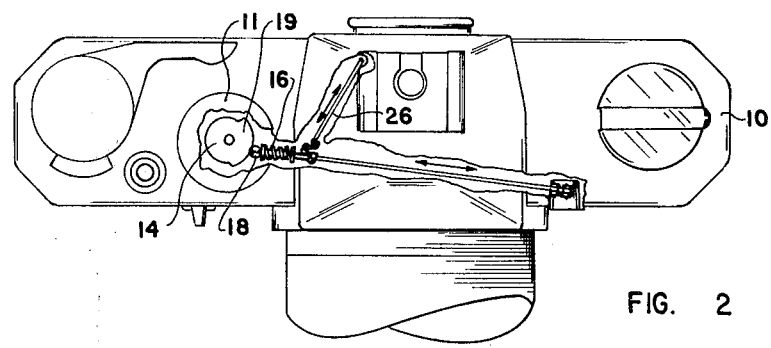
FIG. 2 is a plan view of the invention.
Figure 3:
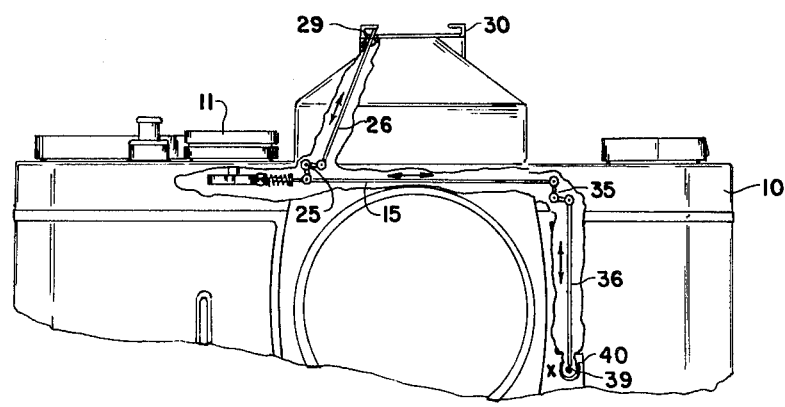
FIG. 3 is a front view of the invention.

Turning now descriptively to the drawings, in which similar reference characters denote similar elements throughout the several views, FIGS. 1-3 illustrate a focal plane shutter camera 10 modified by the mechanical linkage of this invention. In this particular camera 10, the full frame of the film is not completely exposed by the focal plane shutter in operation at a given instant, at faster shutter speeds than 1/60 second and thus X-type (instantaneous) flash units may properly be used only when the shutter speed control knob 11 is rotated to a position in which the shutter speed is 1/60 of a second or slower. Control knob 11 is fixed to an internal rotatable shaft 12 which is linked in conventional fashion to the shutter speed control mechanism (not shown).

In this invention, a cam 14 is fixed to shaft 12 made of camera 10 with a lever arm 15 mounted so that one end 18 of arm 15 radially bears against cam 14. A coil spring 16 about arm 15 biases arm 15 towards the cam 14. Cam 14 is formed with a projecting ear section 19 that extends lever arm 15 in a first position away from the center of cam when ear section 19 bears against arm end 18, with ear section 19 extending circumferentially about cam 14 so as to engage arm end 18 in all rotated positions of cam 14 corresponding to shutter speeds greater than 1/60 of a second.

Arm 15 is pivotally mounted to a first leg of an angle bracket 25 pivotally mounted to the camera frame, with a second leg of bracket 25 pivotally mounted to a slidable rod 26 that extends through the camera body in a first position into the track flange spacing 29 of the flash attachment shoe 30 externally fixed to the camera body, and is withdrawn from the flange spacing 29 in a second position.

Arm 15 is pivotally mounted to a first leg of an angle bracket 35 pivotally mounted to the camera frame, with a second leg of angle bracket 35 pivotally mounted to a slidable rod 36 that extends, in a first position, into the socket opening 39 of the X synchronization electrical socket 40 of the camera so as to block said opening 39, with rod moved clear of socket opening 39 in a second position.

Angle brackets 25 and 35 are mounted so that the first position of arm 15 corresponds to the first position of rods 26 and 36 and the second position of arm 15 corresponds to the second position of rods 26 and 36.

It will be seen that in the first position of arm 15, with knob 11 set for a shutter speed of faster than 1/60 second, a flash unit 50 may not be slid to a seated position in flange 30, nor may the electrical synchronization plug 51 of flash cord 53 be seated in synchronization socket 40.

Conversely if a flash unit 50 or a plug 51 has been seated in flange 30 or socket 40 respectively, knob 14 cannot be rotated to a shutter speed position of faster than 1/60 of a second since arm 15 is prevented from sliding to the first position and therefore will block ear 19 of cam 14 from rotation into a location associated with a higher shutter speed than 1/60 of a second.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A mechanical interlock system mounted in a focal plane shutter camera that blocks the track flange opening of the flash attachment bracket of the camera when the shutter speed control knob of the camera is set for a shutter speed inappropriate for use with a flash unit, in which a cam is fixed to the shaft of the shutter speed control knob of the camera, with mechanical means engaging said cam so as to block the track flange spacing and the electrical socket opening when the control knob is rotated to a speed setting inappropriate for use with a flash unit.

* * * * *